US011726923B2

(12) United States Patent
    Golov (10) Patent No.: US 11,726,923 B2
(45) Date of Patent: Aug. 15, 2023

(54) MEMORY DEVICE WITH CRYPTOGRAPHIC KILL SWITCH

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 248 days.

(21) Appl. No.: 16/444,359

(22) Filed: Jun. 18, 2019

(65) Prior Publication Data

US 2020/0401533 A1 Dec. 24, 2020

(51) Int. Cl.
*G06F 12/14* (2006.01)
*H04L 9/30* (2006.01)
*H04L 9/08* (2006.01)

(52) U.S. Cl.
CPC ...... *G06F 12/1408* (2013.01); *G06F 12/1466* (2013.01); *H04L 9/0825* (2013.01); *H04L 9/30* (2013.01); *G06F 2212/173* (2013.01)

(58) Field of Classification Search
CPC ............ G06F 12/1408; G06F 12/1466; G06F 2221/2103; H04L 9/30; H04L 9/0825; H04L 9/3271; H04M 2203/6072; G06Q 20/388; G07C 2009/00388
See application file for complete search history.

(56) References Cited

U.S. PATENT DOCUMENTS

| 11,050,570 | B1* | 6/2021 | Totah | H04L 63/0428 |
| 2005/0005131 | A1* | 1/2005 | Yoshida | G06F 21/31 |
| | | | | 713/183 |
| 2005/0138386 | A1* | 6/2005 | Le Saint | H04L 9/3226 |
| | | | | 713/185 |
| 2009/0222910 | A1* | 9/2009 | Le Bihan | G06F 21/57 |
| | | | | 726/19 |
| 2014/0025359 | A1* | 1/2014 | McCarron | H04L 67/10 |
| | | | | 703/2 |
| 2018/0081827 | A1* | 3/2018 | Admon | G06F 12/1408 |
| 2019/0332763 | A1* | 10/2019 | Berler | H04L 9/3239 |
| 2020/0169889 | A1* | 5/2020 | Oostdijk | H04W 12/108 |

FOREIGN PATENT DOCUMENTS

WO    WO-2008148623 A1 * 12/2008 ............. G06F 21/45

OTHER PUBLICATIONS

Menezes, A. J., van Oorschot, P. C.,, Vanstone, S. A. (1997). Handbook of Applied Cryptography. CRC Press. pp. 397-405.*

* cited by examiner

*Primary Examiner* — Matthew T Henning
(74) *Attorney, Agent, or Firm* — Greenberg Traurig (57) ABSTRACT

Devices and methods for preventing unauthorized access to memory devices are disclosed. A one-time programmable (OTP) memory is included in both a memory device and a processing device. The OTP memories store encryption keys and the encryption and decryption of messages between the two devices are used as a heartbeat to determine that the memory device has not been separated from the processing device and, in some instances, connected to a malicious processing device.

17 Claims, 5 Drawing Sheets

MEMORY DEVICE WITH CRYPTOGRAPHIC KILL SWITCH

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

Applications that contain sensitive data stored in dynamic random-access memory (DRAM) require such data be protected against unauthorized access. One example of such applications are automotive applications.

To gain unauthorized access to a DRAM, malicious users remove the DRAM from its circuit board while the DRAM is in a self-refresh or standby mode. In the automotive context, a DRAM is in such a mode when the vehicle housing the DRAM is powered off. A malicious user can unsolder the DRAM from its original board (while it is still powered) and quickly relocate the device to a dedicated board or socket which resumes powering the DRAM. In another attack, the malicious user can temporarily freeze the DRAM during removal which reduces the internal leakage of individual DRAM cells. During this process the DRAM may lose power for a brief time (generally on the order of tens of milliseconds). However, most of DRAM cells will not lose the content during this power interruption and the malicious user can then gain access to the contents of DRAM via the controlled board or socket.

The disclosed embodiments provide technical solutions to prevent this type of attack and similar attacks.

DETAILED DESCRIPTION

The disclosed embodiments describe device, systems, methods, and processor-readable media for detecting an attack on a memory device such as a DRAM package. The disclosed embodiments utilize an OTP memory added to both a memory device and a processing device. The OTP memory stores encryption keys and the encryption/decryption of messages between the two devices are used as a heartbeat to determine that the memory device has not been separated from the processing device and, in some instances, connected to a malicious processing device.

Figure 1:
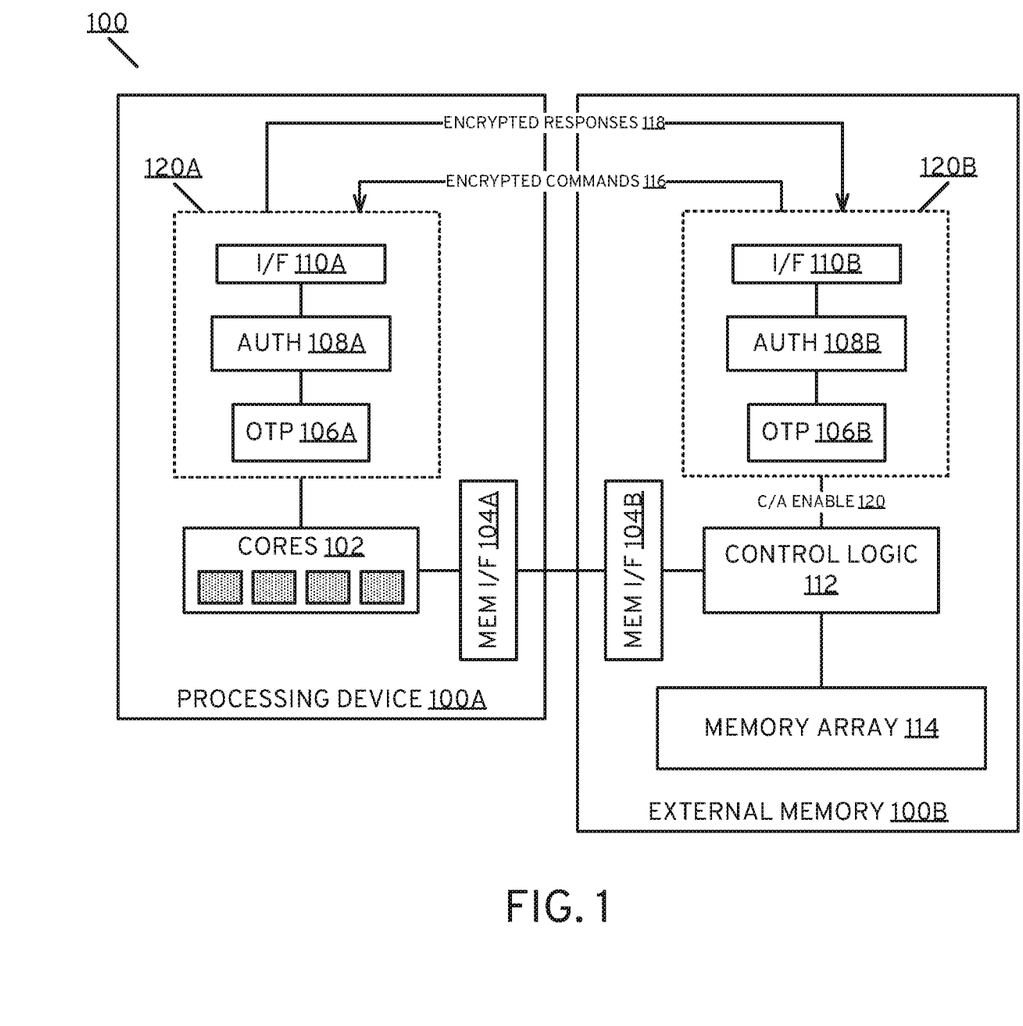
FIG. 1 is a block diagram of a computing device according to some embodiments of the disclosure.

FIG. 1 is a block diagram of a computing device (100) according to some embodiments of the disclosure.

In the illustrated embodiment, the device (100) includes a processing device (100a) and a memory device (100b). In other embodiments, various other components may be included in the device (100). In one embodiment, processing device (100a) can comprise a general purpose central processing unit (CPU), graphics processing unit (GPU), system-on-a-chip (SoC), or other type of processing device. In one embodiment, external memory (100b) comprises a DRAM device although other types of memory devices can be used such as static random-access memory (SRAM) and Flash devices. Generally, any memory device that can be physically separated from a processing device (e.g., by unsoldering) by a user can be used as external memory (100b).

Processing device (100a) and external memory (100b) can include various components. Some components may comprise standard components of such device. For instance, the cores (102) of processing device (100a) can comprises one or more processing cores for performing operations read from memory (either the external memory or an internal memory). Similarly, control logic (112) and memory array (114) of external memory (100b) can comprise standard control logic and memory banks of, for example, a DRAM package. The two devices (100a, 100b) are connected via a standard memory interface (104a, 104b). This memory interface (104a, 104b) allows for the read, writing, and performance of other operations on the external memory (100b). As discussed in FIG. 3, step 302, these components can operate normally as providing memory to a processing device and further detail regarding this mode of operation is not included herein for the sake of clarity.

In contrast to existing devices, processing device (100a) and memory device (100b) are each equipped with authentication circuits (120a, 120b, respectively). These circuits (120a, 120b) allow for out-of-band (OOB) communication between the processing device (100a) and external memory (100b). This communication forms the basis of an authentication mechanism operated by the external memory (100b), which will be described in more detail below.

Each circuit (120a, 120b) includes an OTP memory (106a, 106b), authentication logic (108a, 108b), and a dedicated interface (110a, 110b). In the illustrated embodiment, the OTP memory (106a, 106b) comprises a memory bank that can be written to once and retains that data for its lifetime (i.e., is non-volatile). Any type of OTP memory can be used and the specific type of OTP memory is not limiting. As will be described, the OTP memories (106a, 106b) are used to store encryption keys used by the device (100).

Each circuit (120a 120b) additionally includes an interface (110a, 100b). In one embodiment, this interface (110a, 100b) comprises a serial interface. In one embodiment, the interface (110a, 100b) is separate from other data paths such as memory interface (104a, 104b).

Each circuit (120a 120b) additionally includes authentication logic (108a, 108b). Although illustrated as outside of OTP memory (106a, 106b), in some embodiments, the logic (108a, 108b) is stored within OTP memory (106a, 106b) and executed by a microcontroller or processor (not illustrated). That is, in one embodiment, authentication logic (108a, 108b) can be read from OTP memory (106a, 106b), executed by cores (102) or control logic (respectively), and communicate via interfaces (110a, 110b). In other embodiments, the authentication logic (108a, 108b) can comprise a circuit or field-programmable gate array (FPGA), or other hardwired circuit.

Authentication logic (108a) is responsible for processing encrypted commands (116) received from authentication logic (108b). Authentication logic (108a) decrypts such commands (116), validates that the decryption was successful, and generates encrypted responses (118). Authentication logic (108b) is configured to generate (encrypt) commands (116) and transmit such commands to processing device (100a). Authentication logic (108b) is additionally configured to receive the encrypted responses (118), verify that the responses can be decrypted, and if not raise a command/address bus enable signal (120). These, and other operations, of the authentication logic (108a, 108b) are described more fully in the following descriptions of FIGS. 2 through 5.

Figure 2:
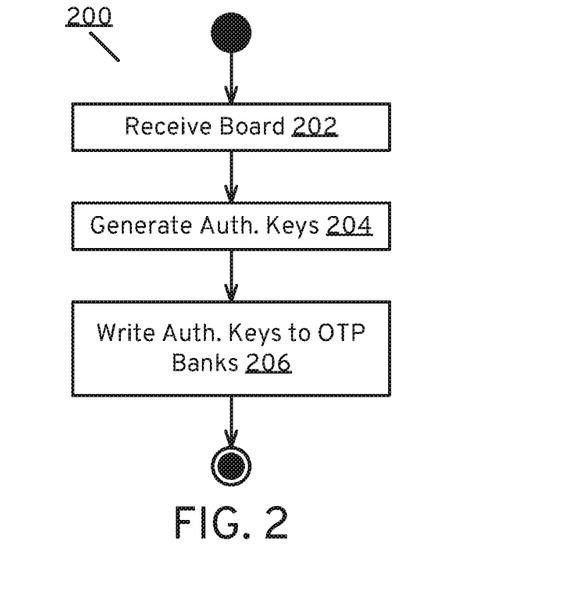
FIG. 2 is a flow diagram illustrating a method for programming a computing system during manufacture according to some embodiments of the disclosure.

FIG. 2 is a flow diagram illustrating a method (200) for programming a computing system during manufacture according to some embodiments of the disclosure. In one embodiment, the method (200) is performed by components of an electronics assembly line. Such components can comprise various devices designed to build and program circuit boards (or other devices) prior to final packaging and/or installation.

In step 202, the method (200) receives a board. In one embodiment, the board comprises a printed circuit board or similar type of board. The board includes at least one processing device and at least one external memory, as described in the description of FIG. 1. In one embodiment, the method (200) receives the board as a final stage of a production pipeline by, for example, robotic or conveyor means.

In step 204, the method (200) generates authentication keys. In one embodiment, the authentication keys comprise encryption and/or decryption keys. In one embodiment, the authentication keys comprise either symmetric or asymmetric keys. In one embodiment, symmetric keys can be generated using Advanced Encryption Standard (AES), Data Encryption Standard (DES), or another symmetric encryption standard. In one embodiment, asymmetric keys can be generated using any public-key cryptography standard such as Rivest-Shamir-Adleman (RSA), Diffie-Hellman, Bimodal Lattice Signature Scheme (BLISS), or another asymmetric encryption standard.

In step 206, the method (200) writes the appropriate authentication keys to the OTP memories of a processing device and external memory. When using symmetric cryptography, the method (200) writes the generated encryption key to both the OTP memory banks on the processing device and the external memory. When using asymmetric cryptography (e.g., Diffie-Hellman), the method (200) writes the respective private keys to the OTP memory of the processing device and external memory. Additionally, the method (200) can write both public keys to each device. In general, the method (200) writes all keys needed to encrypt and decrypt data between the devices using the specified encryption standard. The specific keys written to OTP banks may vary depending on the specific encryption standard used and the embodiments are not limited to a single, specific encryption technique.

After the method (200) completes, each device includes one or more keys stored in OTP memory that can be used in during future communications between the devices, as described in more detail herein.

Figure 3:
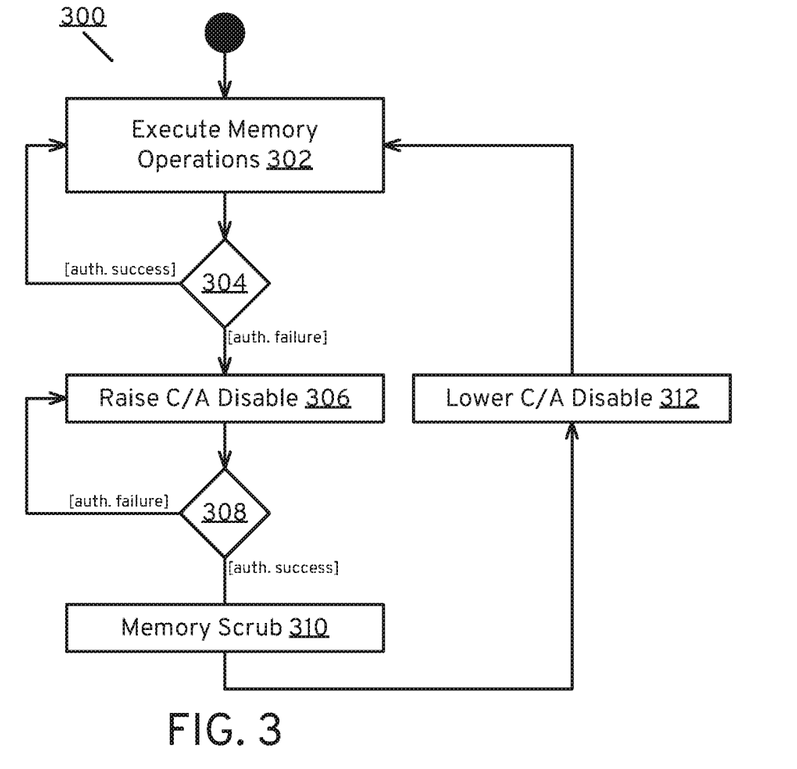
FIG. 3 is a flow diagram illustrating a method for disabling a memory device according to some embodiments of the disclosure.

FIG. 3 is a flow diagram illustrating a method (300) for disabling a memory device according to some embodiments of the disclosure. In the illustrated embodiment, a memory device (e.g., 100b) performs the method (300).

In step 302, the method (302) executes memory operations normally. Examples of such operations are memory read, write, and erase operations. A processing device (e.g., 100a) can issue commands to cause a memory to perform such operations in step 302 during normal operations.

In step 304, the method (300) determines if there has been an authentication failure. The specific details of how the method (300) performs step 304 are described more fully in the description of FIG. 4. In brief, the method (300) can execute step 304 as an OOB or background process while simultaneously executing step 302. An authentication failure is detected when the memory device executing method (300) cannot verify the presence (or identity) of a processing device connected to the memory device. As illustrated, if the memory device can confirm that the authorized processing device is issuing commands to the memory device, the method (300) continues to operate normally in step 302.

In step 306, when the method (300) detects an authentication failure (step 304), the method (300) raises a signal to disable a command/address (C/A) interface of the memory device executing the method (300).

In one embodiment, the signal is transmitted on a C/A input of the memory device. In one embodiment, the C/A input is logically connected to each lines of the C/A interface. For example, raising the C/A disable can comprise lowering the signal to logical zero. The C/A disable is then logically AND'd with each C/A, which drives all C/A lines to logical zero. Other circuitry can be implemented to implement similar functionality.

In step 308, the method (300) determines if an authentication success is detected. In the illustrated embodiment, step 308 is the same as step 304. Namely, the method (300) determines if the memory device is communicating with an authorized processing device. In this step 308, the method (300) is determining if communications between a memory device and authorized processing device are re-established, since the disconnection was previously detected in step 304.

In the illustrated embodiment, an authentication failure of a processing device can additionally include a failure to respond to a command issued by the method (300). Additionally, as described above, a failure can comprise an improperly encrypted response.

If the method (300) continues to detect authentication failures, the method (300) continues to disable the C/A interface (step 306). However, if the method (300) detects an authentication success, this means that the memory device executing the method (300) has re-established communication with a known processing device.

In some embodiments, the method (300) continues to execute memory operations (step 302) after detecting an authentication success. However, for added security, in some embodiments, the method (300) can scrub the memory (step 310) prior to executing memory operations in step 302. In one embodiment, this comprises issuing a RESET command to the memory device, or performing similar commands that will systematically erase the contents of the memory device.

In some embodiments, steps 308-310 are optional. In either embodiment, the method (300) proceeds to execute memory operations by lowering the C/A disable signal (step 312). Lowering the C/A disable signal comprises the inverse of the process described in the description of step 306.

Figure 4:
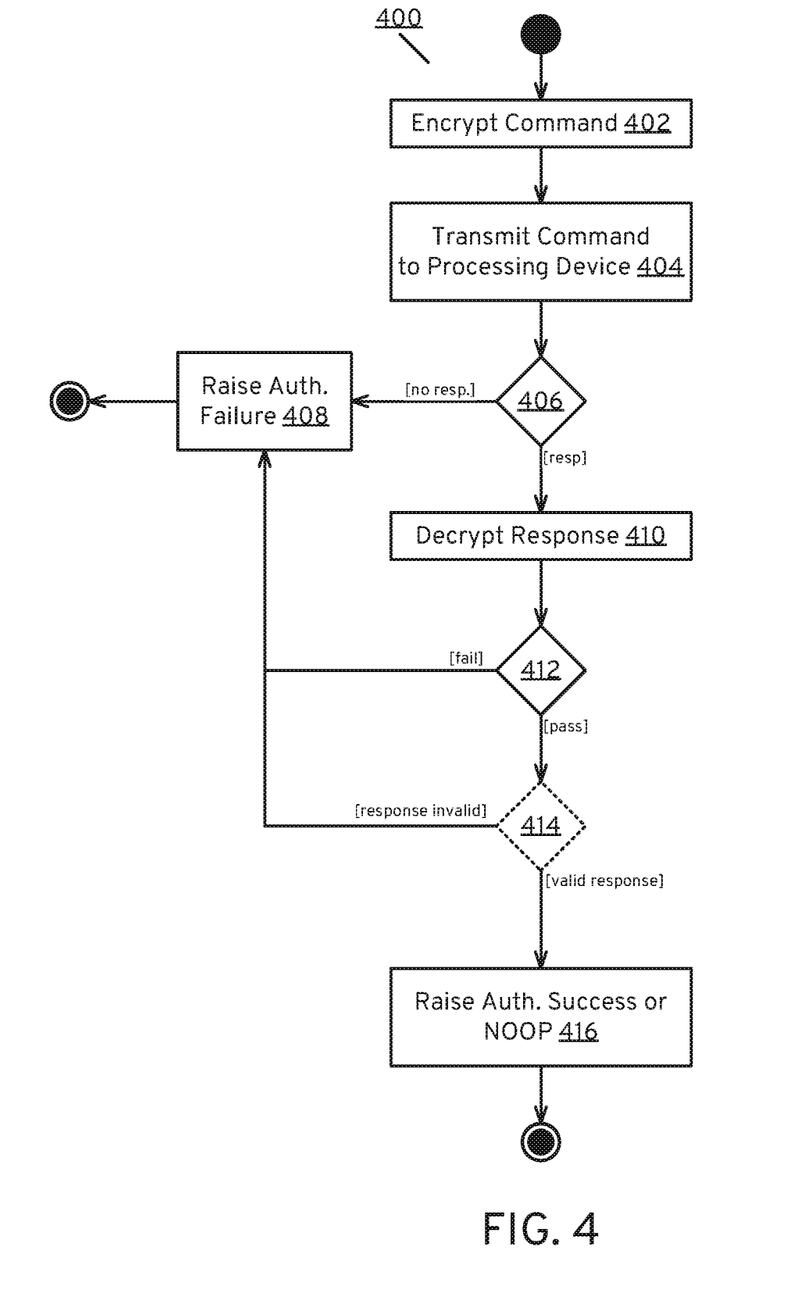
FIG. 4 is a flow diagram illustrating a method for detecting an authentication failure of a memory device according to some embodiments of the disclosure.

The method (300) depicted in FIG. 3 describes how a command/address interface of a memory can be disabled and enabled based on authentication failures and successes. FIG. 4 describes further detail regarding the processes for detecting authentication failures and successes in steps 304 and 308.

FIG. 4 is a flow diagram illustrating a method (400) for detecting an authentication failure of a memory device according to some embodiments of the disclosure. In the illustrated embodiment, a memory device (e.g., 100*b*) performs the method (400).

In step 402, the method (400) encrypts a command.

In one embodiment, the command comprises a request for an authentication message from, for example, a processing device (100*a*). Various types of commands can be encrypted in step 402. In one embodiment, the command comprises a nonce command (e.g., a "PING" command) to which the receiver responds with a nonce command (e.g., a "POND" command). In this embodiment, the content of the command is immaterial and the encryption/decryption of the command/response (discussed below) is used for authentication. In another embodiment, the command can include unique data to be returned in the return message. For example, the command can include a payload (e.g., a random number) that must be decrypted and re-encrypted by the receiver to confirm an identity of the sender. In another embodiment, the command can include a small processing directive (e.g., a proof-of-work requirement) that prevents brute force responses.

As illustrated, whatever command is used is encrypted by the method (400). As discussed above, the method (400) encrypts commands using a key stored by the memory device executing the method (400). This can comprise a shared symmetric key or can comprise an asymmetric public key of the recipient. Thus, in step 402, the method (400) converts a plaintext command to a ciphertext command using a specified encryption algorithm.

In step 404, the method (400) transmits the encrypted command to a processing device. In one embodiment, the method (400) transmits the encrypted command using a dedicate interface. In one embodiment, this dedicated interface is a serial interface. After transmitting the command, the method (400) awaits a response.

In step 406, the method (400) determines if a response is received. In one embodiment, the method (400) uses a decaying timer to determine how long to await a response. In one embodiment, if the method (400) detects a response within that time window, the method (400) proceeds to step 410. However, if the method (400) does not receive response in the allotted time window, the method raises an authentication failure (discussed below) in step 408. In some embodiments, the method (400) can alternatively use a fixed number of clock cycles in lieu of a timer.

In step 408, the method (400) raises an authentication failure if the method (400) does not receive a response to the encrypted command within a predefined time window. In one embodiment, the method (400) raises an authentication failure by enabling a C/A disable signal (discussed previously). Other mechanisms for raising a failure may be utilized that ultimately instruct the memory device to disable a C/A interface may also be used.

If the method (400) determines that a response was received, the method proceeds to decrypt the response in step 410. As will be described in more detail in the description of FIG. 5, the processing device processes the command, encrypts a response, and transmits that response to the memory device executing method (400).

In step 410, the method (400) uses a decryption routine to decrypt the response. In some embodiments, this routine is the decryption routine corresponding to the encryption routine employed in step 402. In alternative embodiments, the decryption method can be different than the encryption method. In one embodiment, the method (400) decrypts the response using a symmetrical key. In other embodiments, the method (400) decrypts the response using its own private key if public-key cryptography is used. In either case, the output of step 410 is a decrypted response.

In step 412, the method (400) determines if the decryption was successful. In one embodiment, step 412 comprises determining if the decryption routine completes without an error. If the method (400) determines that decryption is not possible, it indicates that the sender does not possess the proper encryption keys and thus is unauthorized. Thus, in step 408, the method (400) raises an authentication failure in response to a decryption failure. Details of step 408 were provided previously.

In (optional) step 414, the method (400) determines whether the decrypted response is valid. In the illustrated embodiment, a valid response is one that provides a meaningful response to the encrypted command based on the contents of the command. For example, the command may provide two integers and request the sum from the recipient. In general, the encrypted command will include first data and the response will include second data, such that the memory device executing method (400) can quickly confirm the accuracy of the second data. If the response is invalid (i.e., the payload is not correct), the method (400) raises an authentication failure as described previously.

In step 416, the method (400) raises an authentication success signal or, in other embodiment, performs no operation (NOOP) if the response passes steps 412 and (if implemented) step 414. In one embodiment, raising an authentication signal comprises raising a signal level of a success output. Alternatively, in some embodiments, the method (400) may take no action upon detecting an authentication success.

Figure 5:
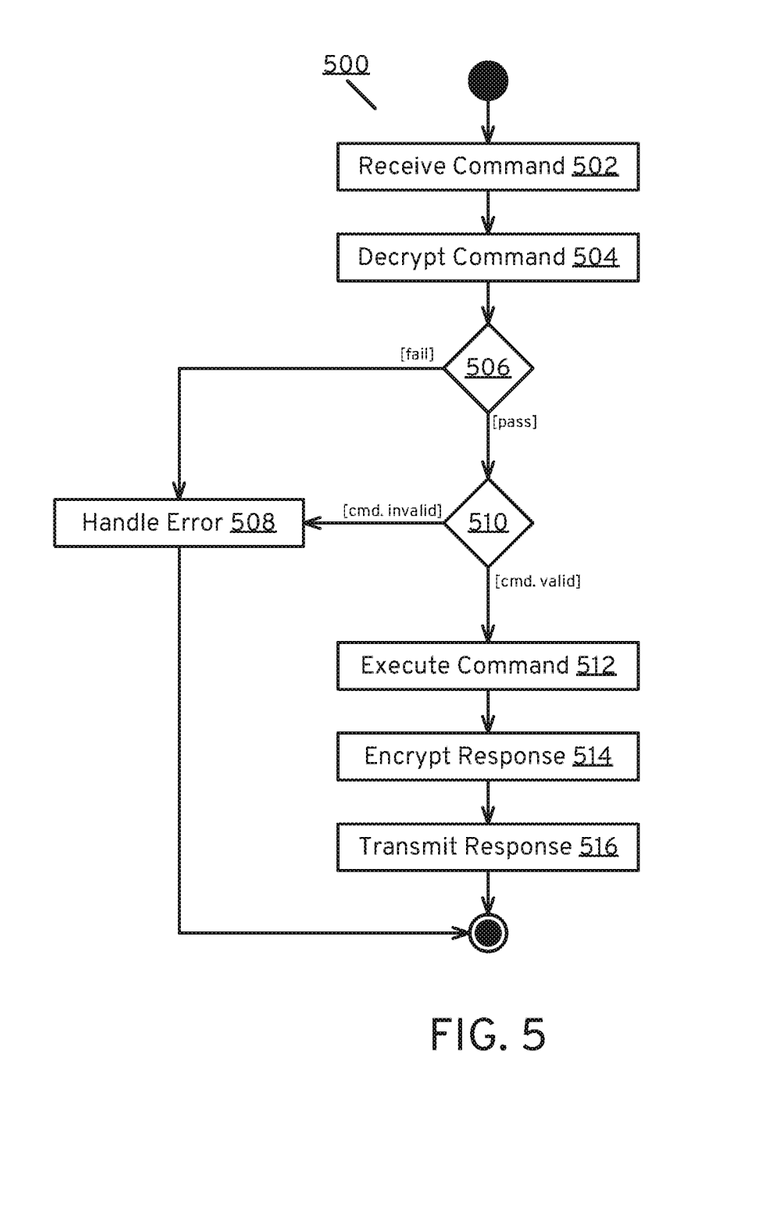
FIG. 5 is a flow diagram illustrating a method for responding to an authentication request according to some embodiments of the disclosure.

FIG. 5 is a flow diagram illustrating a method (500) for responding to an authentication request according to some embodiments of the disclosure. In one embodiment, the method (500) is executed by a processing device (100*a*).

In step 502, the method (500) receives a command. The received command comprises an encrypted command discussed in FIG. 4.

In step 504, the method (500) decrypts the command. In one embodiment, the method (500) decrypts the command using a shared symmetric key. In another embodiment, the method (500) decrypts the command using a private key in a public-key cryptography system. Both embodiments are described previously.

In step 506, the method (500) determines if the decryption is successful. In some embodiments, the method (500) employs step 506 to prevent authorized access to the processing device executing the method (500). Thus, if the method (500) determines that a command was not encrypted successfully, the method (500) raises and handles an error (step 508). In one embodiment, handling an error in step 508 can comprise disabling access to the device sending the command.

In step 510, the method (500) determines if the command format is valid or invalid. In this step, the method (500) determines if it understands the command sent from the transmitter. In one embodiment, this comprises determining if the command name or opcode is a known name or opcode. If the command is invalid or improperly formatted, the method (500) raises and handles an error (508).

In step 512, the method (500) executes the command. In some embodiments, step 512 is optional. In one embodiment, described above, the command causes the processing device executing the method (500) to perform some form of computation to verify its identify (i.e., execute an addition operation or perform a proof-of-work puzzle). If so, the method (500) performs this computation in step 512 and generates a result.

In step 514, the method encrypts a response. In one embodiment, this comprises encrypting a command name and, if necessary, any results computed in step 512. In one embodiment, the method (500) employs either symmetric or asymmetric cryptography as described above.

In step 516, the method (500) transmits the encrypted response to the sender of the command. In one embodiment, this comprises transmitting the encrypted response over a dedicated channel. In some embodiments, this dedicated channel is serial interface channel.

Figure 6:
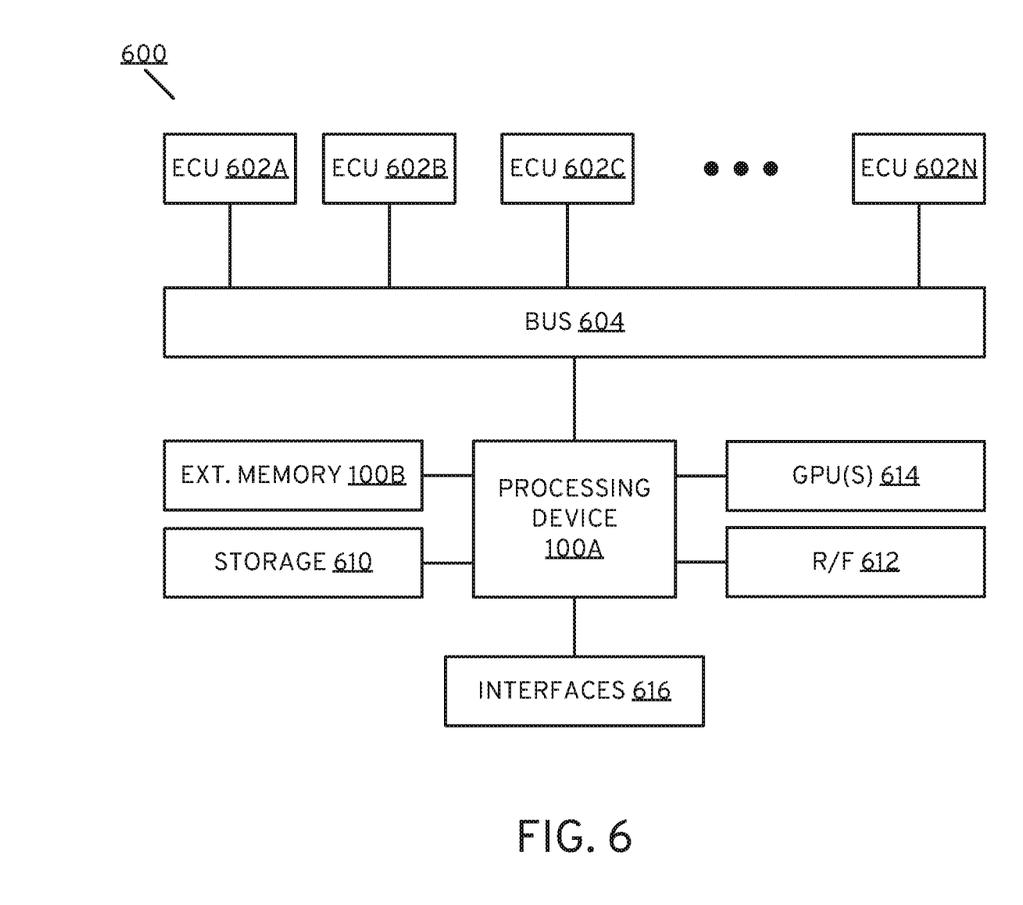
FIG. 6 is a block diagram illustrating a vehicle computing system according to some embodiments of the disclosure.

FIG. 6 is a block diagram illustrating a vehicle computing system (600) according to some embodiments of the disclosure.

In FIG. 6, a vehicle (600) can comprise any type of vehicle (e.g., automobile, boat, etc.). Generally, vehicle can comprise any superstructure housing various discrete computing systems and a vehicle is provided as an example. Vehicle (600) includes one or more engine control unit (ECU) devices (602a-602n). Examples of ECUs include door control unit (DCU), engine control unit, electric power steering control unit (PSCU), human-machine interface (HMI), powertrain control module (PCM), seat control unit, speed control unit (SCU), telematic control unit (TCU), transmission control unit (TCU), brake control module (BCM; ABS or ESC), or battery management system (BMS) devices. While described primarily in the context of ECU devices, any type of embedded computing system may be used in the embodiments disclosed herein and embodiments referencing ECU devices are provided as examples.

ECUs (602a-602n) are each connected to a bus (604). In some embodiments, the bus (604) comprises a car area network (CAN) bus, FlexRay, MOST bus, or any other type of bidirectional communication bus.

The processing side of the system includes one or more processing devices (100a), external memory device (100b), a radio-frequency (R/F) system (612), GPUs (614), long-term storage (610) and one or more interfaces (618). Processing devices (100a) and memory device (100b) are described more fully in the descriptions above. R/F system (612) may comprise a cellular transceiver and/or satellite transceiver. Long-term storage (610) may comprise one or more high-capacity solid-state drives (SSDs). In general, long-term storage (610) may be utilized to store, for example, high-definition maps, routing data, and any other data requiring permanent or semi-permanent storage. GPUs (614) may comprise one or more high throughput GPU devices for processing data received from other vehicle subsystems. Finally, interfaces (616) may comprise various display units positioned within the vehicle (e.g., an in-dash screen).

The present disclosure has been described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used above may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a general-purpose processor, a special-purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

What is claimed is:

1. A method comprising:
transmitting, by a memory device, an encrypted command to a processing device, the encrypted command comprising a proof-of-work requirement;
receiving, by the memory device, a response from the processing device, the response including an encrypted result of executing the encrypted command;
decrypting, by the memory device, the response to obtain a decrypted result;
detecting, by the memory device, that the decrypting failed if the decrypted result is not equal to an expected result of the encrypted command;
disabling, by the memory device, an interface in response to detecting that the decrypting failed by raising a signal causing the memory device to drive lines of the interface to zero;
detecting, by the memory device, that a second decrypting of a second response is successful;
scrubbing, by the memory device, one or more memory banks; and
lowering, by the memory device, the signal to enable access to the lines of the interface.

2. The method of claim 1, further comprising generating the encrypted command by encrypting a plaintext command using a shared private key.

3. The method of claim 2, the decrypting the response comprising decrypting the response using the shared private key.

4. The method of claim 1, further comprising generating the encrypted command by encrypting a plaintext command using a public key.

5. The method of claim 4, the decrypting the response comprising decrypting the response using a private key corresponding to the public key.

6. The method of claim 1, the disabling the interface causing the memory device to ignore any instructions transmitted over the interface.

7. The method of claim 1, the detecting that the decrypting failed further comprising determining whether the response is valid or invalid.

8. A device comprising:
a memory array;
control logic communicatively coupled to the memory array;
a one-time programmable (OTP) memory bank, the OTP storing at least one key; and
authentication logic the authentication logic configured to:
transmit an encrypted command to a processing device, the encrypted command comprising a proof-of-work requirement,
receive a response from the processing device, the response including an encrypted result of executing the encrypted command,
decrypt the response to obtain a decrypted result,
detect that the decrypting failed,
disable an interface of the control logic in response to detecting that the decrypting failed by raising a signal causing the memory device to drive lines of the interface to zero;
detect that a second decrypting of a second response is successful,
scrub one or more memory banks, and
lower the signal to enable access to the lines of the interface.

9. The device of claim 8, the memory array comprising a dynamic random-access memory (DRAM) array.

10. The device of claim 8, the interface comprising a serial interface.

11. The device of claim 8, the at least one key comprising a shared symmetric key.

12. The device of claim 8, the at least one key comprising a private key unique to the device, and a public key of the processing device, the private key used to decrypt the response and the public key used to encrypt the command.

13. A non-transitory computer readable storage medium for tangibly storing computer program instructions capable of being executed by a processor, the computer program instructions defining steps of:
transmitting an encrypted command to a processing device, the encrypted command comprising a proof-of-work requirement;
receiving a response from the processing device, the response including an encrypted result of executing the encrypted command;
decrypting the response to obtain a decrypted result;
detecting that the decrypting failed if the decrypted result is not equal to an expected result of the encrypted command;
disabling an interface in response to detecting that the decrypting failed by raising a signal driving lines of the interface to zero;
detecting that a second decrypting of a second response is successful;
scrubbing one or more memory banks; and
lowering the signal to enable access to the lines of the interface.

14. The non-transitory computer readable storage medium of claim 13, the instructions further defining the step of generating the encrypted command by encrypting a plaintext command using a shared private key, wherein the decrypting the response comprising decrypting the response using the shared private key.

15. The non-transitory computer readable storage medium of claim 13, the instructions further defining the step of generating the encrypted command by encrypting a plaintext command using a public key, wherein the decrypting the response comprising decrypting the response using a private key corresponding to the public key.

16. The non-transitory computer readable storage medium of claim 13, the disabling the interface comprising ignoring any instructions transmitted over the interface.

17. The non-transitory computer readable storage medium of claim 13, the detecting that the decrypting failed further comprising determining whether the response is valid or invalid.

* * * * *